United States Patent
Papiernik et al.

(10) Patent No.: US 6,456,897 B1
(45) Date of Patent: Sep. 24, 2002

(54) CONTROL METHOD AND NUMERICAL CONTROL FOR MOTION CONTROL OF INDUSTRIAL MACHINE TOOLS

(75) Inventors: Wolfgang Papiernik, Neunkirchen; Gerhard Pfaff, Erlangen; Martin Teckentrup, Zirndorf, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/394,203

(22) Filed: Sep. 10, 1999

(51) Int. Cl.⁷ .............................................. G06F 19/00
(52) U.S. Cl. ............................. 700/194; 700/250; 901/9
(58) Field of Search ..................... 700/41–45, 61–63, 700/192–194, 251, 262, 188; 318/568.11, 568.24; 901/15, 9

(56) References Cited

U.S. PATENT DOCUMENTS

| | | | | |
|---|---|---|---|---|
| 4,625,285 A | * | 11/1986 | Mori et al. ................. | 700/262 |
| 4,734,866 A | * | 3/1988 | Bartelt et al. ............... | 700/262 |
| 4,860,215 A | * | 8/1989 | Seraji ......................... | 700/251 |
| 4,887,222 A | * | 12/1989 | Miyake et al. ............... | 901/2 |
| 5,129,045 A | * | 7/1992 | Stelzer et al. ............... | 700/251 |
| 5,206,930 A | * | 4/1993 | Ishilkawa et al. ........... | 700/251 |

* cited by examiner

Primary Examiner—Leo Picard
Assistant Examiner—Kidest Bahta
(74) Attorney, Agent, or Firm—BakerBotts LLP (57) ABSTRACT

Control of machine tools and industrial robots is usually implemented in a cascade structure, having not only numerous advantages but also the fundamental disadvantage of lower dynamics in the response to set point in comparison with a single control loop. This disadvantage is compensated today by feed-forward control concepts which permit ideal tracking of the controlled variable without intervention by the controllers, apart from inaccuracies in modeling of the controlled system or disruptions. The enormous computation complexity of these precontrol methods in higher order systems has provided the motivation for the development of a cartesian path control concept which is described in the present invention. While retaining the cascade structure, path accuracy can be improved significantly in comparison with axial feed-forward concepts.

17 Claims, 9 Drawing Sheets

CONTROL METHOD AND NUMERICAL
CONTROL FOR MOTION CONTROL OF
INDUSTRIAL MACHINE TOOLS

FIELD OF THE INVENTION

The present invention relates to a control method and a numerical control for controlling the motion of industrial machine tools, robots or the like. Reference input variables for the machine are generated in a cartesian coordinate system and subjected to a kinematic transformation into a machine coordinate system to specify motion parameters axially for one or more drives of the machine.

BACKGROUND INFORMATION

Control of machine tools and industrial robots is usually implemented by purely axial control in a cascade structure which has, in addition to numerous advantages, the basic disadvantage of lower dynamics in response to set point changes in comparison with a single control loop. This disadvantage is compensated today by feed-forward concepts which permit ideal tracking of the controlled variable without intervention by controllers, apart from disturbances or inaccuracies of the model of the controlled system.

Another disadvantage is the enormous amount of computation power of these feed forward controll method in higher order systems.

SUMMARY

An object of the present invention is to create an alternative path control concept that will also significantly improve the path accuracy, or rather, permitting a lower contour error in comparison with axial feed-forward control concepts while also permitting a lower contour error.

According to the present invention, this object is achieved by providing a control method for motion control in which the cartesian reference input variables in the cartesian coordinate system are controlled by subjecting the resulting cartesian motion values to a kinematic transformation into the machine coordinate system to specify motion parameters axially for each drive. Actual motion values determined in the cartesian coordinate system and belonging to the cartesian reference input variables and/or cartesian motion values are sent back as controlled variables to the cartesian control, so that the kinematic transformation into the machine coordinate system is compensated inversely by the mechanical system of the machine.

The preceding object is also achieved by providing a numerical control algrithm for motion control suitable for performing the control method, having a reference input variable generator for the machine in the cartesian coordinate system, a means for kinematic transformation of the reference input variables into a machine coordinate system and a means for axially driving of one or more drives of the machine with motion parameters derived from the reference input variables. A cartesian control of the cartesian reference input variables is provided, and its resulting cartesian motion values are transformed by the means for kinematic transformation into the machine coordinate system in order to be specified as motion parameters axially for each drive, with a measuring system being provided for determining actual motion values belonging to the cartesian reference input variables and/or cartesian motion values in the cartesian coordinate system, the detector system supplying controlled variables to the cartesian control, with the mechanical system of the machine being used as the means for inverse kinematic transformation into the machine coordinate system.

Through the present invention, the non-linear kinematic transformation, among other things, is inversely compensated by the inverse transformation contained in the mechanical system. Thus, the controlled system is always linear from the standpoint of the controller if the sampling time and thus the achievable controller dynamics are small enough.

In this way, complicated methods of acceleration feed-forward control, in particular with elasticity in the mechanical system, can be avoided. Since the position measured in cartesian coordinates is processed directly without any kinematic transformation, errors due to inaccuracies in kinematics such as thermal expansion, backlash, deformation, etc. are conceptually excluded. A contour error of almost zero can be achieved through a suitable characteristic of the controller structure.

On the basis of the cartesian control concept according to the present invention, the following different advantageous instances of a cartesian control according to the present invention can be created, among other things.

According to a first example embodiment of the control method and the numerical control for motion control, a cartesian position control, kinematic transformation and axial speed and acceleration control are provided by performing a cartesian position control of cartesian position setpoints by subjecting the resulting cartesian speed values to a kinematic transformation into the machine coordinate system and specifying them as speed parameters of an axial speed and/or acceleration control for each drive. Actual position values determined in the cartesian coordinate system and belonging to the cartesian position setpoints are sent back as controlled variables to the cartesian position control.

Another example embodiment performs a cartesian position and speed control, subsequent kinematic transformation and axial acceleration control by performing a cartesian position and speed control of cartesian position setpoints by subjecting the resulting cartesian acceleration values to a kinematic transformation into the machine coordinate system and specifying them as acceleration parameters of an axial acceleration control for each drive. Actual position values determined in the cartesian coordinate system and belonging to the cartesian position setpoints and speed setpoints are sent back as controlled variables to the cartesian position control, and actual speed values are sent back as controlled variables to the cartesian speed control.

Another example embodiment permits a cartesian position, speed and acceleration control and a subsequent kinematic transformation of the voltage values of a converter by performing a cartesian position, speed and acceleration control of cartesian position setpoints by subjecting the resulting cartesian current or voltage setpoints to a kinematic transformation into the machine coordinate system and specifying them as the current or voltage values for each drive. Actual position values determined in the cartesian coordinate system and belonging to the cartesian position setpoints, speed setpoints and acceleration setpoints are sent back as controlled variables to the cartesian position control, actual speed values being sent back as controlled variables to the cartesian speed control and actual acceleration values are sent back as controlled variables to the cartesian acceleration control.

The three example embodiments described above can be implemented in different ways. Examples in this regard are described below.

Another example embodiment uses the normal error and the tangential error as a deviation for cartesian position control of the path.

It is especially advantageous for the actual cartesian motion values to be determined by direct measurement of the position in the cartesian coordinate system, in particular at the outer end of the machine kinematics, in particular a robot gripper or a tool.

As an alternative, the actual cartesian motion values can also be determined by indirect axial measurement of the position in the machine coordinate system and subsequent inverse transformation into the cartesian coordinate system.

According to another advantageous embodiment, axial control parts remaining in the, machine axes are equipped with known feed forward control methods for one or more corresponding axial motion parameters for more accurate control of a mechanical system with inherent elasticities, for example.

Therefore, the dynamics of axial partial controls remaining in the response to set point changes can be further utilized through known axial feed-forward concepts as part of a cartesian path control according to the present invention.

DETAILED DESCRIPTION

The concept presented below according to the present invention is based on the fact that in machining processes, no spatial deviation of the actual path from the programmed path can be tolerated, and a time-delayed but spatially accurate movement along the desired contour does not constitute an accurate path either. Therefore, the contour error or normal error $\Delta \vec{r}_n$ and the tangential error $\Delta \vec{r}_t$ are used for position control, as illustrated in FIG. 1, instead of the deviations from the setpoint and actual position values in the machine axes, e.g., $\Delta x$, $\Delta y$.

Figure 1:
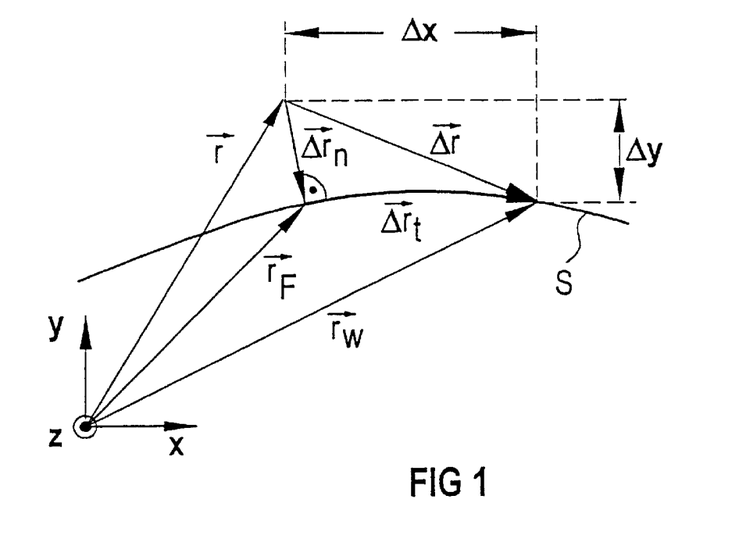
FIG. 1 is a vector diagram of the tracking error components for illustration of normal error and tangential error in the cartesian coordinate system.

FIG. 1 shows a vector diagram of the tracking error components for path control on a programmed path S. This shows a cartesian coordinate system with the three axes x, y and z. One vector $\vec{r}$ extends from the origin of the cartesian coordinate system to an actual position. Another vector $\vec{r}_F$ extends to the normal base point and a third vector $\vec{r}_w$ extends to the setpoint position.

This analysis permits a separation of the control dynamics from the tangential direction and the normal direction in addition to increasing the path accuracy.

The control structure of the cartesian path control according to the present invention is presented and explained below on the basis of theoretical considerations for any machine kinematics. In addition to an estimate of complexity in comparison with the known position control in machine axes, the efficiency of this method and of numerical control according to the present invention is shown on the basis of measurement results.

If possible, the variables used are combined into vectors in the remaining figures and are shown with double lines in the structural diagrams. Vectors in cartesian coordinates are provided with the index 'xy.' Analysis of a variable into normal and tangential components with respect to the programmed path is indicated by the index 'nt.' In the remaining figures and discussion, the position vector is abbreviated as $\vec{r}^{xy}$, the speed as $\vec{v}^{xy}$ and the acceleration as $\vec{a}^{xy}$ as already shown in FIG. 1. The respective setpoints are provided with a 'w' subscript.

A description of a spatial motion in natural coordinates is explained below.

To describe the motion of a point in space, the natural coordinate system is also available in addition to the cartesian diagram (FIG. 1). These are the three unit vectors of the so called "Freuet frame" which accompany point P represented by unit vector $\vec{e}_t$ in the tangential direction, $\vec{e}_n$ in the direction of the main normal and $\vec{e}_b$ in the direction of the binormal. The third component can be omitted here, because the additional considerations are limited to planar movement sequences. However, it is readily possible to expand the method according to the present invention to three-dimensional sequences without any restrictions.

Figure 2:
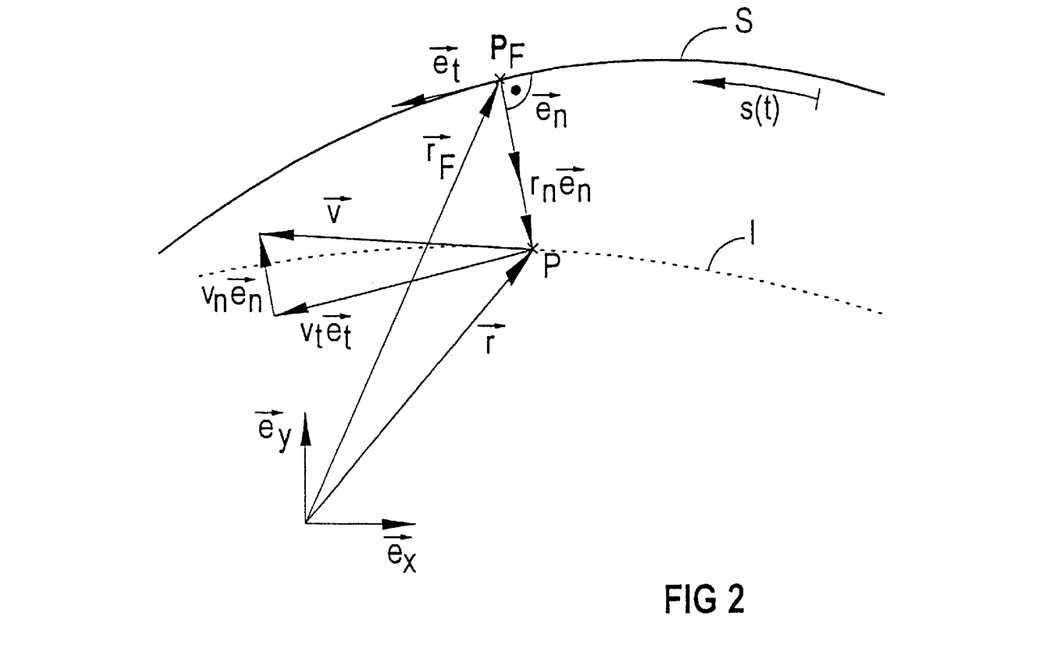
FIG. 2 is a vector diagram to illustrate a an error of the actual path from the programmed path in the natural coordinate system.

If such a natural coordinate system according to the diagram in FIG. 2 places the normal base point at point $P_F$ on programmed path S, its motion can be described as follows:

$$\vec{r}_F^{xy} = \vec{r}_F^{xy}(S(t))$$

$$\vec{v}_F^{xy} = v_F \cdot \vec{e}_t \quad \vec{a}_F^{xy} = \dot{v}_F \cdot \vec{e}_t + \frac{v_F^2}{\rho_w} \cdot \vec{e}_n.$$

The radius of curvature of programmed path S is given as $\rho_w$, the path traveled on the (are length) is given as s(t).

Starting from $\vec{r}_F^{xy}$, the position vector of actual position P on actual path I deviating from programmed path S can be given as:

$$\vec{r}^{xy} = \vec{r}_F^{xy} + r_n \cdot \vec{e}_n$$

After corresponding conversion, differentiation yields a speed vector composed of normal speed and tangential speed as follows:

$$\vec{v}^{xy} = v_F \cdot \vec{e}_t + \dot{r}_n \cdot \vec{e}_n + r \cdot \vec{e}_n = v_n \cdot \vec{e}_n + v_t \cdot \vec{e}_t. \quad (5)$$
$$\dot{r}_n$$

Since the position and speed in the tangential and normal directions are derived from one another by differentiation, a position control in these components can be implemented in the same way as in the cartesian system.

The procedure of kinematic transformation is explained in greater detail below.

To obtain setpoints for axis controllers of a numerical control system, the cartesian setpoints must be transformed into the machine space, taking into account the given mechanical arrangement, and the actual values of the position must be transformed in the opposite direction.

The position vector $\vec{r}^{xy}(t)$ of a point shown in the cartesian coordinates can be determined from the position values in machine coordinate G by a nonlinear transformation A, which depends on the mechanical kinematic, as follows:

$$\vec{r}^{xy}(t) = \Lambda(\vec{r}^G(t)) \quad (1)$$

Actual values in machine coordinates, such as the position in calculation procedure (1), are characterized below by a 'G' superscript.

The time derivation of the position yields the speed in cartesian coordinates using the chain rule as follows:

$$\vec{v}^{xy}(t) = \frac{d\vec{r}^{xy}(t)}{dt} = \frac{\partial \Lambda(\vec{r}^G(t))}{\partial \vec{r}^G(t)} \cdot \frac{d\vec{r}^G(t)}{dt} = \quad (2)$$
$$= J(\vec{r}^G(t)) \cdot \frac{d\vec{r}^G(t)}{dt} = J(\vec{r}^G(t)) \cdot \vec{v}^G(t)$$

Jacobi matrix $$\frac{\partial \Lambda(\vec{r}^G(t))}{\partial \vec{r}^G}$$

is abbreviated below as J.

Conversion of the position vector from cartesian coordinates to machine coordinates G takes place according to the equation:

$$\vec{r}^G(t) = \Lambda^{-1}(\vec{r}^{xy}(t)), \quad (3)$$

and transformation of the speed vector takes place after conversion of calculation procedure (2) through the inverse of the Jacobi matrix:

$$\vec{v}^G(t) = J(\vec{r}^G(t))^{-1} \cdot \vec{v}^{xy}(t), \quad (4)$$

Transformation of the speed setpoint is explained in greater detail below.

Speed setpoints can be transformed from natural coordinates into cartesian coordinates by using a vector rotator:

$$\begin{pmatrix} v_{xw} \\ v_{yw} \end{pmatrix} = \begin{pmatrix} \cos\varphi_w & -\sin\varphi_w \\ \sin\varphi_w & \cos\varphi_w \end{pmatrix} \cdot \begin{pmatrix} v_{tw} \\ v_{nw} \end{pmatrix} = \overline{T}^{-1} \cdot \begin{pmatrix} v_{tw} \\ v_{nw} \end{pmatrix}. \quad (5)$$

Angle $\phi_w$ of rotation between the cartesian coordinate system and the natural coordinate system is defined by the speed setpoint in the normal base point as:

$$\Phi_w = \arctan2(v_{yw}(u), v_{xw}(u)), \quad (6)$$

In addition to the calculation of arc tan from the quotient of $v_{wy}$ and $v_{wx}$, their signs must also be analyzed from the arc tan 2 function to arrive at an angle in the range $[0;2.\pi[$. The computation complexity can be reduced drastically if the calculation of the angle value is omitted and instead the sine or cosine of angle $\phi_w$ needed for the transformation is determined directly from the components of the speed vector according to the equations:

$$\sin\varphi_w = \frac{v_{yw}(\tilde{u})}{\sqrt{v_{yw}(\tilde{u})^2 + v_{xw}(\tilde{u})^2}} \quad bzw, \quad \cos\varphi_w = \frac{v_{xw}(\tilde{u})}{\sqrt{v_{yw}(\tilde{u})^2 + v_{xw}(\tilde{u})^2}} \quad (7)$$

(bzw.=and)

In this procedure, the above-mentioned analysis of signs is also omitted.

Before presenting a possible structure of the cartesian path control according to the present invention on the basis of the preceding considerations, the conventional axial position control in the cascade structure according to the present state of the art is briefly presented below for comparison purposes.

Figure 3:
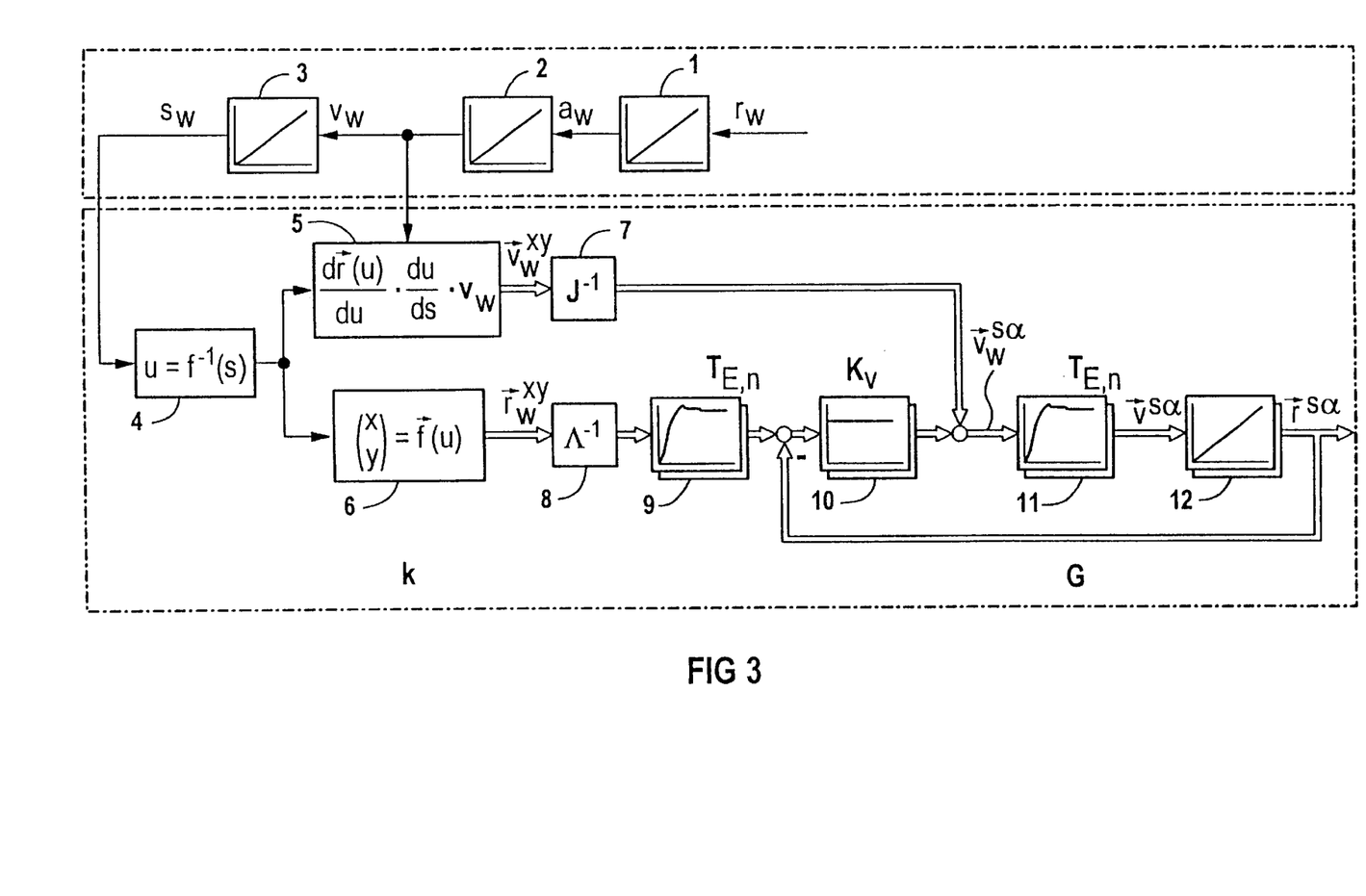
FIG. 3 shows a conventional controller structure of a position control in the machine coordinate.

The illustration according to FIG. 3 shows the position control loops 9 through 12 assigned to the machine axes and provided with a speed feed-forward 5, 7. To make them symmetrical, the position setpoints of the individual axes are delayed sent as models of the closed speed control circuit over PT$_2$ elements 9.

If the programmed contour is described in the form of C$^2$-steady splines using a path parameter u, the arc length s can be determined as a function of the path parameter according to the equation:

$$s = \int \|\vec{r}_w{}^1(u)\| du = f(u) \quad (8)$$

Since this is an elliptical integral, a closed solution is impossible, so the analysis must be performed numerically, e.g., using the Euclidean standard.

On the basis of inversion function 4, $u = f^{-1}(s)$, the respective path parameter and thus the programmed cartesian position can be determined from the arc lenghts required by jerk-limited motion control 1, 2, 3. Their time derivation 5 yields the speed setpoint as follows:

$$\vec{v}_w(t) = \frac{d\vec{r}_w(u)}{dt} = \frac{d\vec{r}_w(u)}{du} \cdot \frac{du}{ds} \cdot \frac{ds}{dt} = \frac{d\vec{r}_w(u)}{du} \cdot \frac{du}{ds} \cdot v_w \quad (9)$$

The term $$\frac{du}{ds}$$

contained therein corresponds to the reciprocal of the integrand of computation procedure (8), so that the programmed speed can be calculated from the instantaneous value of the path parameter and speed setpoint $v_w$ of motion control 1, 2, 3. The cartesian setpoint values can then be transformed by transformations 7, 8 to linkage space G on the basis of computation procedures (3) and (4).

Figure 4:
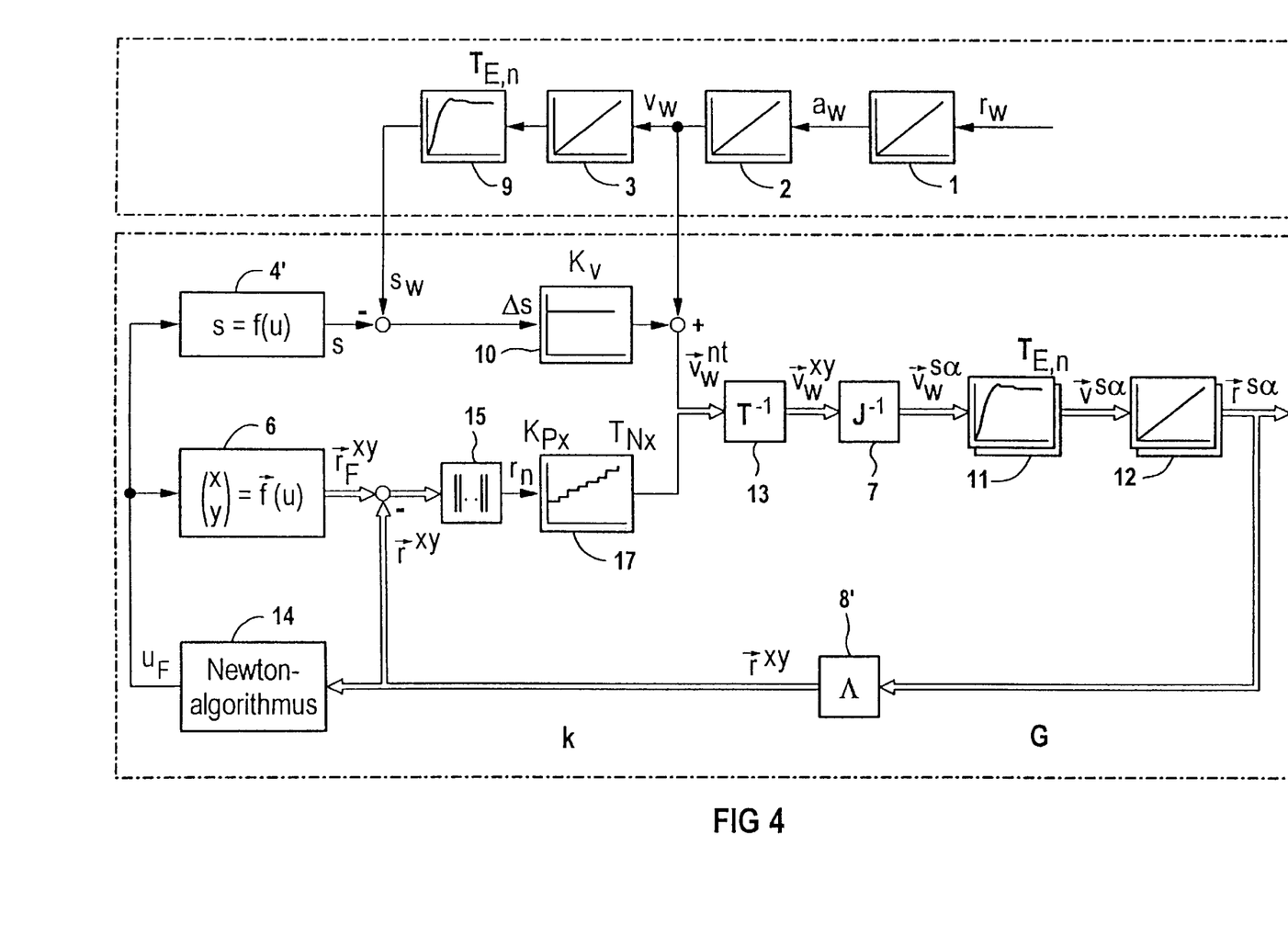
FIG. 4 shows a control structure of a (artesian path control according to the present invention.

In contrast with the conventional control in cascade structure using the position in the machine axes as controlled variables, the position control of the cartesian path control is based on the normal error—i.e., the deviation from the programmed contour—and the tangential error. The possible control structure according to the present invention shown in FIG. 4 illustrates that velocity and speed control 11, 12 remain in the machine axes, so that, for example, effects due to a mechanical system containing elasticities can be handled with the known methods of feed-forward controls and control (e.g., state control).

The normal base point is to be determined from the actual position value (computation procedure (1)) converted into cartesian coordinates in order to be able to compute the corresponding normal error $r_n$ and tangential error $\Delta s$. The position of the normal base point is determined by the fact that at this point the tangent at the programmed contour is perpendicular to the connecting line with respect to the actual point, so that the respective value of the path parameter is determined from the following relationship:

$$(\vec{r}_F - \vec{r}) \cdot \frac{d\vec{r}_F}{du} = 0$$

When using cubic splines, this means a search for the zeroes of a $5^{th}$ order polynomial, which can be achieved only numerically. By using the newtonian method 14, the required computation power can be minimized, especially since a good starting value is available with the value determined in the preceding control cycle.

If the value of the path parameter belonging to the normal base point is known, its position, the contour error, as well as the contour length to the beginning of the path (see computation procedure (8)) can be calculated. Difference $\Delta S$ between actual path S and programmed path Sw, which is specified by the motion control, is sent in the tangential direction to position controller 10, which is implemented as a P controller to guarantee approach the target position without overshoot. In contrast with that, normal controller 17 is a PI controller because it is responsible exclusively for correcting contour deviations. To obtain feed-forward of speed, the speed determined by the motion control is added to the output value of the tangential position controller.

Here again, the position setpoint must also be delayed using a model 9 of the closed rpm control loop for balancing. The control in the normal direction remains unaffected by these additions because it does not have any direct influence on the response to set point changes.

The output values of position controllers 10, 17, i.e., the setpoints for tangential and normal speed, are converted first into cartesian system k with transformation 13 and then into the machine axes coordinates by inverse 7 of the Jacobi matrix.

With sufficient dynamics of the speed control loop, the inverse Jacobi matrix is compensated by the Jacobi matrix contained in the controlled system so that from the standpoint of position controllers 10, 17, the path is described approximately by the series connection of a $PT_2$ element 11 (speed control loop) and an integral element 12. Because the Jacobi an depends on the position, it is important for the latter to be adapted fast enough. This requires a suitable system clock depending on the desired traversing speed. The same observations also apply to rotational matrix $T^{-1}$ and 13, whose "inverse" is contained in the contour and tangential error calculation.

If the structures shown according to FIGS. 3 and 4 are compared, it is clear that the complexity for transformations 7, 8 or 7, 8, 13 between the different coordinate systems and the actual control is largely identical. The complexity for the additional determination of the normal base point, which is necessary in path control, can be minimized by using newtonian method 14 and a favorable choice of the initial values so that it plays only a subordinate role.

Figure 5:
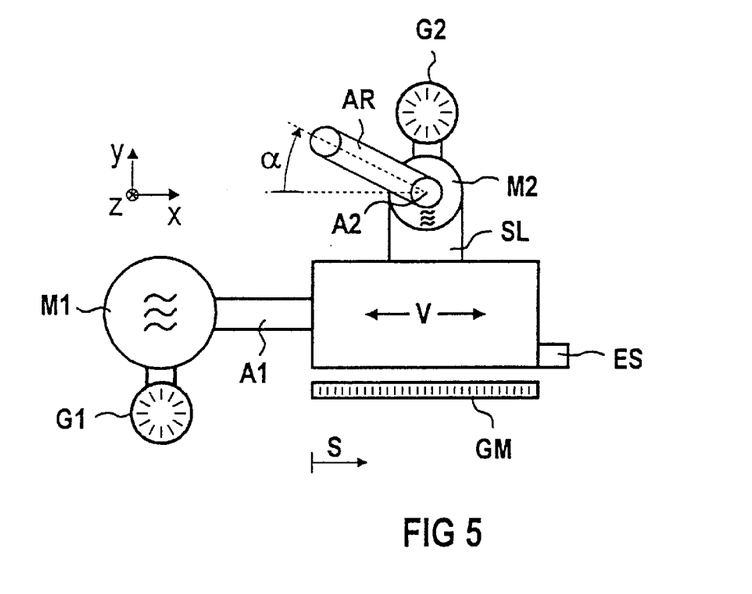
FIG. 5 is schematic diagram of two axes kinematics for practical testing of the cartesian path control according to the present invention.

The practical investigation of cartesian path control according to the present invention has been based on two axes kinematics with a translatory axis A1 and a rotational axis A2, shown in the diagram according to FIG. 5.

The main component of translatory axis A1 is a "commercially available" feed unit V with a first motor M1, an axis A1, a carriage SL with linear measuring system GM and end switch ES (a first detector is assigned to motor M1), permitting a maximum travel distance of 630 mm. A second motor M2 is mounted on carriage SL of translatory axis A1, positioning a pivotable arm AR so that two-dimensional motion processes are possible with the tip of the arm. A second sensor G2 is assigned to second motor M2.

Mathematical Description of the Machine Kinematics

The position setpoints are first specified in cartesian coordinates and consequently must be transformed to the machine coordinates. If the variables introduced in FIG. 5 are used, the following relationship holds:

$$\begin{pmatrix} S_w \\ \alpha_w \end{pmatrix} = \begin{pmatrix} x + l \cdot \sqrt{1 - \left(\frac{y_w}{l}\right)^2} \\ \arcsin\left(\frac{y_w}{l}\right) \end{pmatrix}. \tag{10}$$

Since the investigated path control concept according to the present invention is advantageously based on the analysis of the position error in the normal and tangential components, the actual position in cartesian coordinates must also be known, i.e., determined directly (e.g., the transmitter mounted at one end of arm AR, whose signals are detected by receivers arranged outside the work space of arm AR). However, applications where a direct relationship of the mechanical system (fixed point with respect to the gripper) permits an inference as to the position of the gripper are also possible. It is also conceivable to calculate the actual position in cartesian coordinates from the indirect detection of position according to calculation procedure (11):

$$\begin{pmatrix} x \\ y \end{pmatrix} = \begin{pmatrix} s + l \cdot \cos(\alpha) \\ l \cdot \sin(\alpha) \end{pmatrix}. \tag{11}$$

The time derivation of this equation yields the following for the transformation of the actual speed values from the machine axes into the cartesian coordinate system:

$$\begin{pmatrix} \dot{x} \\ \dot{y} \end{pmatrix} = \overline{J} \cdot \begin{pmatrix} \dot{s} \\ \dot{\alpha} \end{pmatrix} = \begin{pmatrix} 1 & -l \cdot \sin(\alpha) \\ 0 & l \cdot \cos(\alpha) \end{pmatrix} \cdot \begin{pmatrix} \dot{s} \\ \dot{\alpha} \end{pmatrix}. \tag{12}$$

In the opposite direction, the cartesian speed setpoints are transformed into machine coordinates by inverse 8 of the Jacobi matrix into joint space G as setpoints for the speed controller:

$$\begin{pmatrix} \dot{s} \\ \dot{\alpha} \end{pmatrix} = J^{-1} \cdot \begin{pmatrix} \dot{x} \\ \dot{y} \end{pmatrix} = \begin{pmatrix} 1 & \tan(\alpha) \\ 0 & \dfrac{l}{l \cdot \cos(\alpha)} \end{pmatrix} \cdot \begin{pmatrix} \dot{x} \\ \dot{y} \end{pmatrix}. \qquad (13)$$

Figure 6:
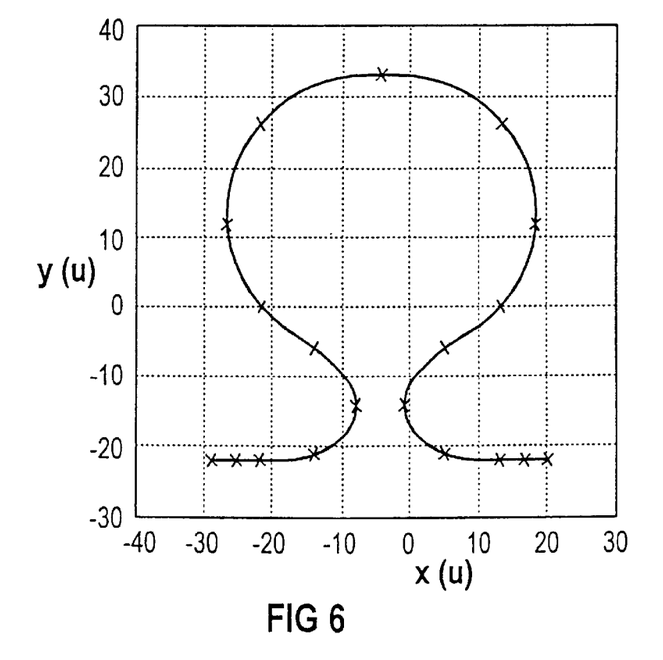
FIG. 6 shows an example of a contour having a $C^2$-steady spline.
Figure 7:
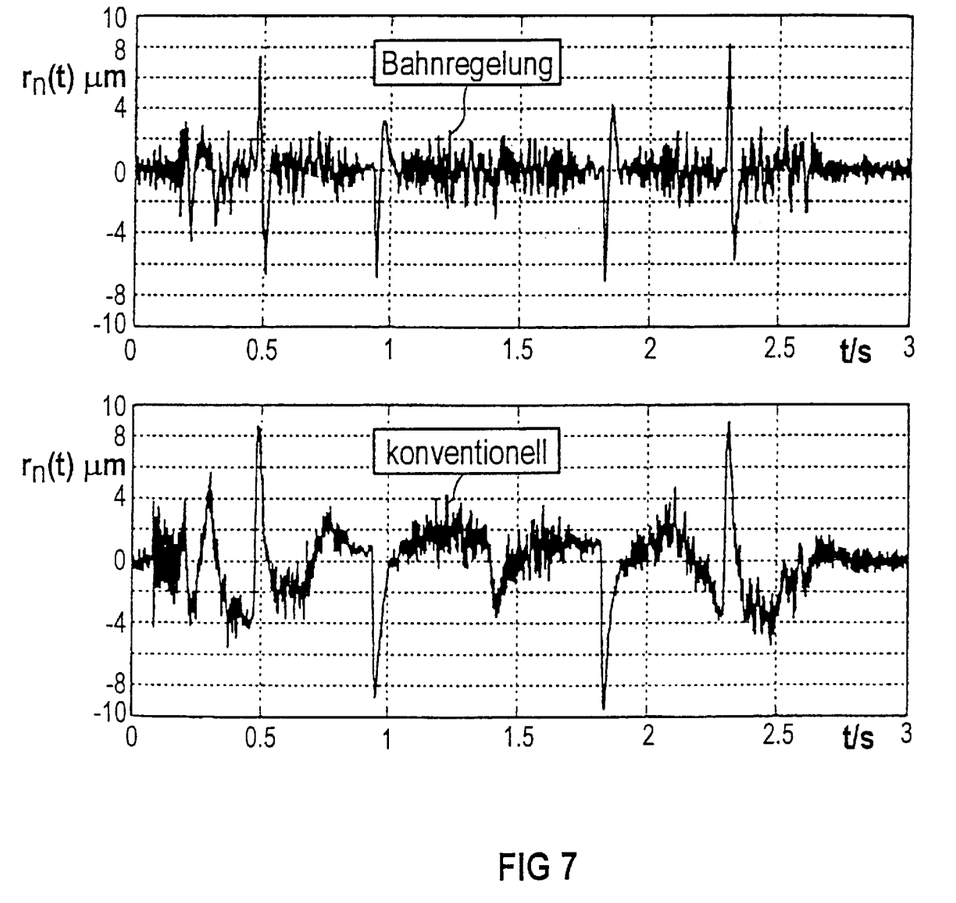
FIG. 7 shows a resulting contour error in an example of a contour after cartesian path control according to the present invention and after a conventional axial control.

The contour shown in FIG. 6 is used for comparison of cartesian path controls according to the present invention with feed-forward of the tangential speed and conventional control with axial speed feed-forward. It has a $C^2$-steady spline. FIG. 7 shows the time curves of the contour error in both methods (top: cartesian control; bottom: conventional control, each in units of mm) at a maximum path speed of v=4.5 m/min.

For interpretation of the results, it is important to know that actual positions at the right next to the contour as seen in the direction of movement essentially lead to positive contour errors, so that with circular contours, for example, a reversal in the direction of rotation of the movement leads to a change of signs with no change in the time characteristic of the contour error.

The greatest contour inaccuracies in the form of the pronounced peaks are to be attributed to a change in the direction of movement of feed unit V or arm AR with both types of control. The influence of sudden changes in load torque can be compensated by friction pre-control.

In the course of the contour error, "excursions" which can be attributed to the changing curvature of the programmed contour occur at other locations. The changes in radial acceleration required in this area despite a constant path speed also represent disturbances for speed controller 11, 12. However, their influence can be eliminated by an acceleration feed-forward control from the existing values for the motion guidance and the programmed path.

However, the comparative diagram in FIG. 7 shows clearly the gain in contour accuracy of the cartesian path control according to the present invention.

Figure 8:
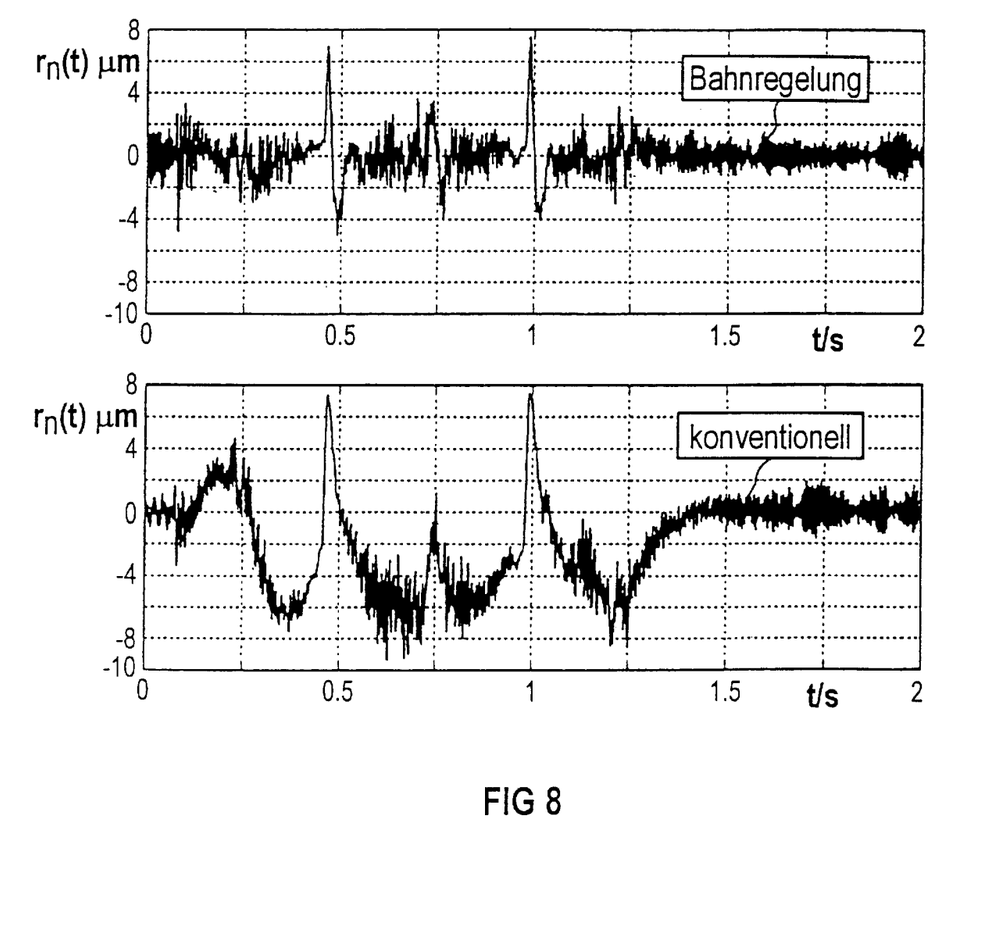
FIG. 8 shows the contour error in a circular path with a cartesian path control according to the present invention and a conventional axial control.

As an additional test contour, a path composed of interpolation points arranged in a circle with a radius r≈25 mm was selected and was traversed at a maximum speed of v=9 m/min=150 mm/s. The diagram according to FIG. 8 (same arrangement as in FIG. 7) again shows a comparison of the resulting contour errors. The resulting path deviation also confirms the superiority of the path control.

Possible instances of a cartesian path control according to the present invention, based on the preceding variants, are presented below on the basis of the schematic diagrams according to FIGS. 9 through 11.

Figure 9:
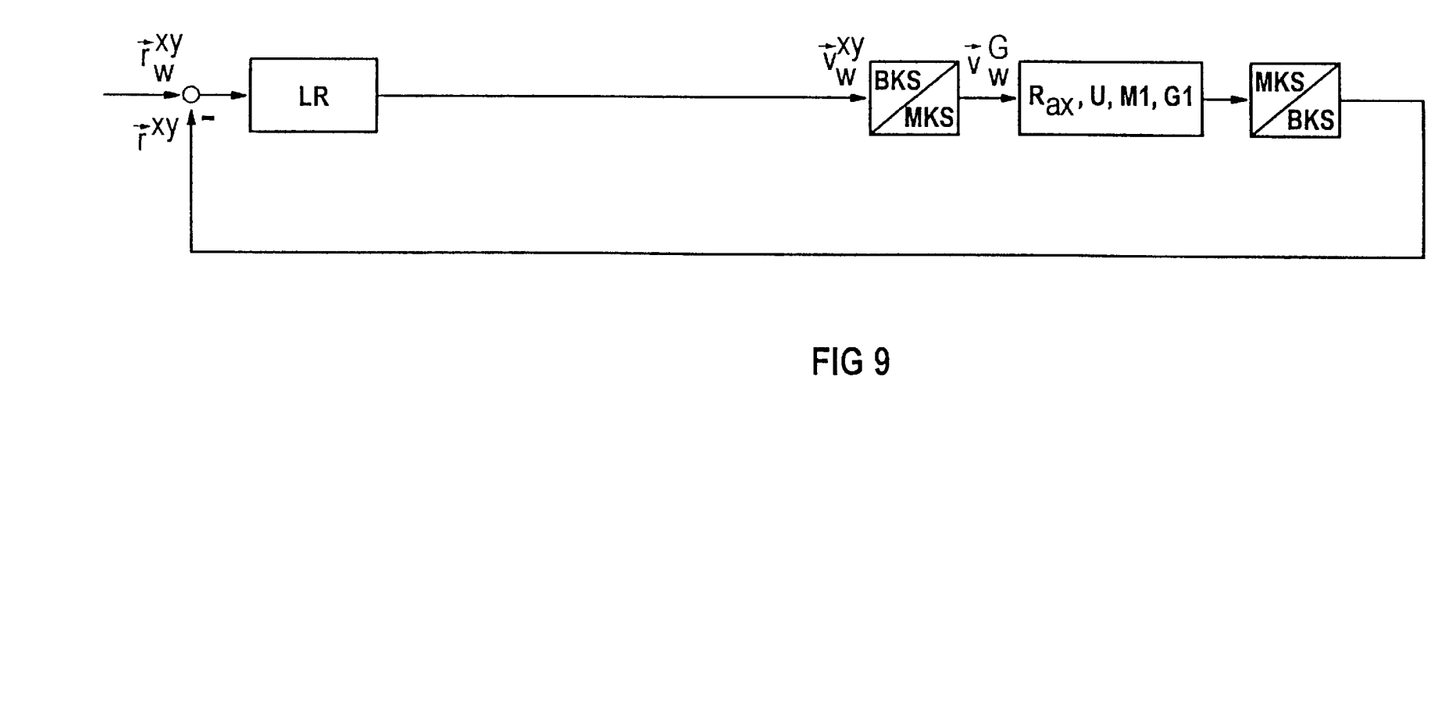
FIG. 9 shows a control structure for cartesian position control according to the present invention.

FIG. 9 shows a schematic diagram of a cartesian position control such as that explained above on the basis of FIG. 4 and the associate variants. Cartesian position setpoints $$\vec{r}_w^{xy}$$

are supplied to a cartesian position controller LR which supplies corresponding speed setpoints $$\vec{v}_w^{xy}$$

as motion parameters. There is a kinematic transformation from cartesian coordinate system BKS into machine coordinate system MKS, which yields speed setpoints $$\vec{v}_w^G$$

for control in the machine axis. These setpoints are used to drive an axial control $R_{ax}$ with a converter U, a motor M1 and a detector system G1 assigned to it. The latter have the known design, which is why they are not shown in detail.

Detector system G1 may be designed as a direct measurement system, with the result that the direct cartesian position $\vec{r}^{xy}$ of the axis of motor M1 or of a machine element mounted on that axis is supplied, so that this actual position value $\vec{r}^{xy}$ can be sent back to the input of the cartesian position controller LR.

Another possibility on which the diagram according to FIG. 9 is based is for an indirect measurement to be performed by detector system G1. Detector system G1 then supplies an actual position value in machine coordinate system MKS. Therefore, there is an inverse transformation of this actual position value into cartesian coordinate system BKS. The resulting actual position value in cartesian coordinate system $\vec{r}^{xy}$ is also sent back to the input of cartesian position controller LR.

Figure 10:
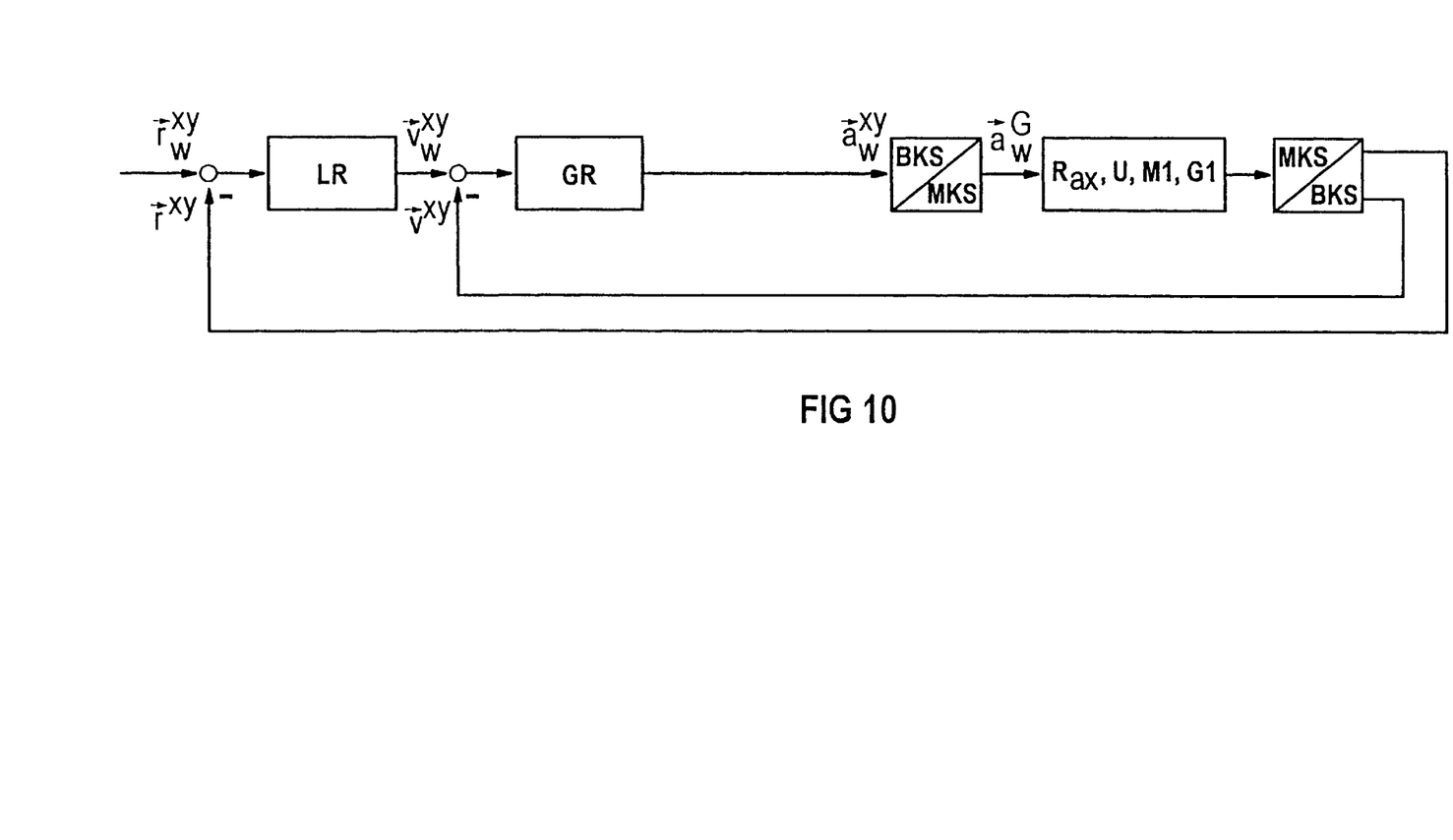
FIG. 10 shows a control structure for cartesian position and speed control according to the present invention.

FIG. 10 shows a schematic diagram of a possible embodiment of a cartesian position control LR and cartesian speed control GR, having essentially the same design as in FIG. 9, but a cartesian speed controller GR, subordianated to the cartesian position controller, receives the cartesian speed setpoint $$\vec{v}_w^{xy}$$

supplied by cartesian position controller LR and supplies the corresponding cartesian acceleration setpoints $$\vec{a}_w^{xy},$$

which are then transformed from cartesian coordinate system BKS into machine coordinate system MKS analogous to the preceding variants in FIG. 9 in order to drive a corresponding axial control $R_{ax}$. Axial control $R_{ax}$ now includes only an acceleration/torque control, because the speed control is already implemented by cartesian speed controller GR. Axial control $R_{ax}$ is in turn followed by a converter U, motor M1 and a detector system G1 in the known design. The analysis by the detector system G1 can take place in the same way as explained with regard to FIG. 9, but with the difference that except for an actual cartesian position value $\vec{r}^{xy}$ a corresponding actual cartesian speed value $\vec{v}^{xy}$ is determined and is sent back to the input of the cartesian speed controller GR.

Figure 11:
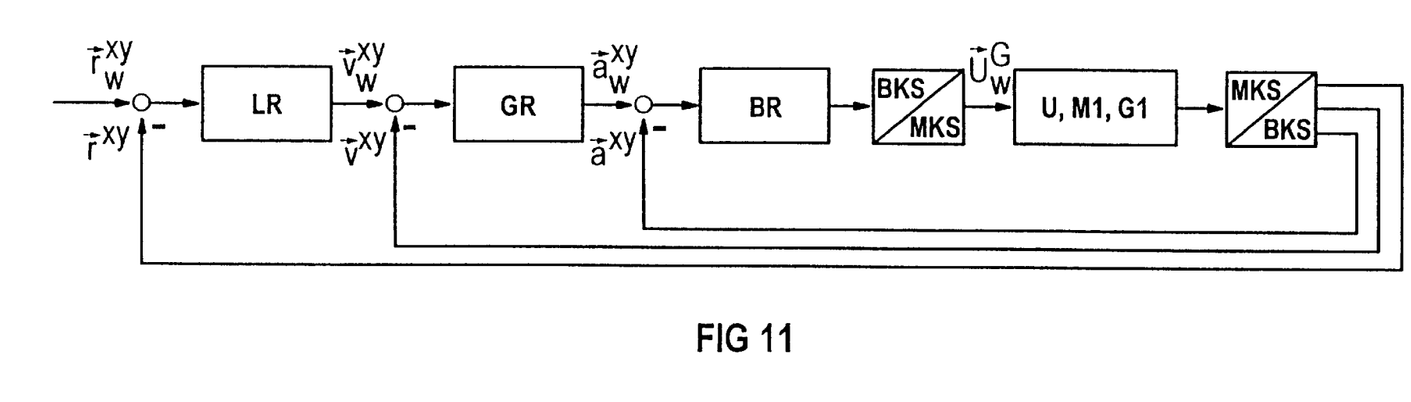
FIG. 11 shows a control structure for cartesian position, speed and acceleration control according to the present invention.

The diagram in FIG. 11 shows another possible embodiment with cartesian position control LR, speed control GR and cartesian acceleration control BR. This design corresponds essentially to that in the two FIGS. 9 and 10 described above. Cartesian speed controller GR is followed by another cartesian controller, namely acceleration controller BR. This supplies current or voltage values $$\vec{U}_w^{xy}$$

for driving a converter U. These values are transformed from cartesian coordinate system BKS into machine coordinate system MKS in the same way as described above and they drive converter U as corresponding current or voltage value $$\vec{U}_w^G.$$

This is followed in the known way by a motor M1 to which is assigned a detector signal G1. Again in this embodiment, detector system G1 can supply corresponding actual values through direct or indirect measurement. In addition to actual position value $\vec{r}^{xy}$ and actual speed value $\vec{\alpha}^{xy}$, the detector system also supplies an actual acceleration value $\vec{\alpha}^{xy}$ which is sent back to the input of cartesian acceleration controller BR as a controlled variable.

The efficiency of cartesian path control, the principle of which is created according to the present invention, can be further improved by the additions in the area of friction compensation and acceleration feed-forward. Likewise, the system may be supplemented by a direct cartesian measurement system to avoid measurement errors that occur in indirect measurement because of torsion, backlash and pitch errors. Additionally, this creates the prerequisite for achieving a high path accuracy on the basis of the cartesian path control method even with new types of articulated arm kinematics, where inaccuracies in the articulated joint, sagging of the and changes in length still cause fundamental problems today due to temperature drift.

What is claimed is:

1. A control method for motion control of a machine comprising:
   generating, in a cartesian coordinate system, reference input variables for the machine;
   performing a cartesian control of the cartesian reference input variables in the cartesian coordinate system to form cartesian motion values;
   transforming the cartesian motion values with a kinematic transform into a machine coordinate system;
   axially driving the machine as a function of motion parameters, the motion parameters being derived from the transformed motion values;
   determining actual motion values of the machine in the cartesian coordinate system, the actual motion values belonging to at least one of the cartesian reference input values and the cartesian motion values; and
   using the actual motion values as controlled values for the cartesian control so that the kinematic transformation into the machine coordinate system is compensated inversely by a mechanical system of the machine.

2. The control method according to claim 1, wherein the machine is one of an industrial machine tool and a robot.

3. A control method for motion control of a machine, the machine having at least one drive, comprising:
   generating, in a cartesian coordinate system, cartesian position setpoints for the machine;
   performing a cartesian position control of the cartesian position setpoints in the cartesian coordinate system to form cartesian speed values;
   transforming the cartesian speed values with a kinematic transform into a machine coordinate system;
   specifying, as a function of the transformed speed values, speed parameters of one of axial speed and acceleration control for each at least one drive of the machine;
   determining actual position values of the machine in the cartesian coordinate system and belonging to the cartesian setpoints; and
   using the actual position values as controlled variables for the cartesian position control.

4. A control method for motion control of a machine having at least one drive, comprising:
   generating, in a cartesian coordinate system, cartesian position setpoints for the machine;
   performing a cartesian position and speed control of the cartesian position setpoints in the cartesian coordinate system to form cartesian acceleration values;
   transforming the cartesian acceleration values with a kinematic transform into a machine coordinate system;
   specifying, as a function of the transformed acceleration values, acceleration parameters of an axial acceleration control each at least one drive of the machine;
   determining actual position values of the machine in the cartesian coordinate system and belonging to the cartesian setpoints and speed setpoints;
   determining actual speed values of the machine;
   using the actual position values as controlled variables for the cartesian position control; and
   using the actual speed values as controlled variables for the cartesian speed control.

5. A control method for motion control of a machine having at least one drive, comprising:
   generating, in a cartesian coordinate system, cartesian position setpoints for the machine;
   performing a cartesian position, speed and acceleration control of the cartesian position setpoints in the cartesian coordinate system, to form one of cartesian current setpoints and cartesian voltage setpoints;
   transforming the one of cartesian current setpoints and cartesian voltage setpoint with a kinematic transform into a machine coordinate system;
   specifying, as a function of the transformed setpoints, one of current values and voltage values for each at least one drive of the machine;
   determining actual position values of the machine in the cartesian coordinate system and belong to the cartesian setpoints and speed setpoints;
   determining actual speed values of the machine;
   determining actual acceleration values of the machine;
   using the actual position speed values of the machine, speed setpoints and acceleration setpoints as controlled variables for the cartesian position control;
   using the actual speed values of the machine as controlled variables for the cartesian speed control; and
   using the actual acceleration values of the machine as controlled variables for the cartesian acceleration control.

6. The control method according to claim 5, further comprising:
   regulating normal error and tangential error regulated as a deviation for cartesian position control of a path.

7. The control method according to claim 5, further comprising:
   determining the actual position values by directly measuring a position in the cartesian coordinate system at an outer end of machine kinematics, the machine kinematics being one of on a robot gripper and on a tool.

8. The control method according to claim 4, further comprising:
   determining the actual position values by indirectly measuring a position in the machine coordinate system; and transforming the actual position values into the cartesian coordinate system.

9. The control method according to claim 8, further comprising:
performing an axial feedforward control to specify at least one of speed parameters and acceleration parameters.

10. A numerical control system for motion control of a machine, comprising:
a generator generating in a cartesian coordinate system reference input variables;
a cartesian control device generating in the cartesian coordinate system cartesian motion parameters as a function of the reference input variables;
a transformation device for transforming, using a kinematic transformation, the reference input signals into a machine coordinate system;
an arrangement providing motion parameters for axially driving at least one drive of the machine with motion parameters derived from the reference input variables; and
a detector system determining actual motion values belonging to one of the cartesian reference input variables and the cartesian motion values in the cartesian coordinate system, the detector system supplying controlled variables to the cartesian control device;
wherein a mechanical system of the machine is used for inverse kinematic transformation into the machine coordinate system.

11. A numerical control system for motion control of a machine, comprising:
a generator generating in a cartesian coordinate system cartesian position setpoints;
a cartesian position control device generating in the cartesian coordiante system cartesian speed values as a function of the cartesian position setpoints;
a transformation device transforming the cartesian speed values into a machine coordinate system using a kinematic transform;
an arrangement providing at least one of an axial speed and axial acceleration parameter for driving at least one drive of the machine, the at least one of the axial speed and axial acceleration parameter being derived from the transformed speed values; and
a detector system detecting actual position values of the machine and supplying the actual position values to the cartesian position control device as controlled variables, the actual position values being determined in the cartesian coordinate system and belonging to the cartesian position setpoints.

12. A numerical control device for motion control of a machine, comprising:
a generator generating in a cartesian coordinate system cartesian position setpoints;
a cartesian position control device and a cartesian speed control device, the cartesian position control device and the cartesian speed control device generating in the cartesian coordinate system cartesian acceleration values as a function to the cartesian position setpoints;
a transformation device transforming the cartesian acceleration values into a machine coordinate system using a kinematic transform;
an arrangement providing acceleration parameters for driving the machine as a function of acceleration parameters of an axial acceleration control, the acceleration parameters being derived from the transformed acceleration values; and
a detector system detecting actual position values of the machine and actual speed values of the machine, and supplying the actual position values and speed setpoints to the cartesian position control device as controlled variables, the actual position values being determined in the cartesian coordinate system and belonging to the cartesian position setpoints, the detector system further supplying the actual speed values of the machine to the cartesian speed control device as controlled variables.

13. A numerical control system for motion control of a machine, comprising:
a generator generating in a cartesian coordinate system cartesian position setpoints;
a cartesian position control device, a speed control device and an acceleration control device generating in the cartesian coordinate system one of cartesian current setpoints and cartesian voltage setpoints as a function of the cartesian position setpoints;
a transformation device transforming the one of the cartesian current setpoints and the cartesian voltage setpoints into a machine coordinate system using a kinematic transform;
an arrangement providing at least one of current values and voltage values for driving the machine, the at least one of the current values and voltage values being derived from the transformed one of the cartesian current setpoints and cartesian voltage setpoints; and
a detector system detecting actual position values of the machine and actual speed values of the machine, the detector system supplying the actual position values, speed setpoints and acceleration setpoints to the cartesian position control device as controlled variables, the actual position values being determined in the cartesian coordinate system and belonging to the cartesian position setpoints, the detector system further supplying the actual speed values of the cartesian speed control device as controlled variables, and supplying actual acceleration values to the cartesian acceleration control device.

14. The numerical control system according to claim 11, wherein normal error and tangential error are used as a deviation by the cartesian position control device.

15. The numerical control according to claim 11, wherein the detector system includes a transmitter for determining the actual cartesian motion values, the transmitter being positioned at an outer end of machine kinematics, the detector system further including receivers which respond to the transmitter, the receivers being positioned at several points outside a work space of the machine.

16. The numerical control according to claim 11, wherein the detector system includes one or a rotary and a translatory detector for determining the actual cartesian motion values, the detector system further including an inverse transformation device for transforming the actual axial motion values into the cartesian coordinate system.

17. The numerical control according to claim 10, further comprising:
an axial feedforward controller for axial specification of at least one of the motion parameters.

* * * * *